US012495251B2

(12) United States Patent
Tu et al.

(10) Patent No.: US 12,495,251 B2
(45) Date of Patent: Dec. 9, 2025

(54) PAIRING METHOD OF DUAL CHANNEL AND MOBILE DEVICE

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 263 days.

(21) Appl. No.: 18/327,878

(22) Filed: Jun. 1, 2023

(65) Prior Publication Data

US 2024/0357288 A1 Oct. 24, 2024

(30) Foreign Application Priority Data

Apr. 20, 2023 (TW) ................................ 112114734

(51) Int. Cl.
*H04R 3/12* (2006.01)
*H04S 1/00* (2006.01)

(52) U.S. Cl.
CPC ................. *H04R 3/12* (2013.01); *H04S 1/00* (2013.01); *H04R 2203/12* (2013.01)

(58) Field of Classification Search
CPC ...... H04R 3/12; H04R 29/001; H04R 29/002; H04R 29/004; H04R 29/005; H04R 29/008; H04R 2203/02; H04R 3/005; H04R 2430/23; H04S 7/302; H04S 7/303; H04S 7/40
USPC ...................................................... 381/58–59
See application file for complete search history.

(56) References Cited

U.S. PATENT DOCUMENTS

| | | | | |
|---|---|---|---|---|
| 9,992,591 | B2 * | 6/2018 | Kelloniemi | H04R 27/00 |
| 10,554,712 | B2 * | 2/2020 | Lang | H04N 21/436 |
| 12,238,507 | B2 * | 2/2025 | Lyren | H04R 5/033 |
| 12,250,530 | B2 * | 3/2025 | Park | G10L 15/22 |
| 2013/0163794 | A1 * | 6/2013 | Groves | G06F 1/1626 381/303 |
| 2015/0325245 | A1 * | 11/2015 | Ikizyan | H04R 1/403 381/22 |

FOREIGN PATENT DOCUMENTS

| | | |
|---|---|---|
| CN | 106664497 | 8/2021 |
| CN | 110691304 | 11/2021 |
| EP | 3306958 | 4/2018 |

* cited by examiner

*Primary Examiner* — Disler Paul
(74) *Attorney, Agent, or Firm* — JCIPRNET

(57) ABSTRACT

A pairing method of dual channel and a mobile device are provided. In the method, an available area is defined according to a first position relation between two audio playback devices and a reference target. A second position relation between the mobile device and the available area is determined. A first corresponding relation between the two audio playback devices and audio signals of the left channel and the right channel is determined according to the second position relation. The audio signals of the left channel and the right channel are played by the two audio playback devices respectively according to the first corresponding relation. Accordingly, the existing problem that the dual channel could not be distinguished may be solved.

13 Claims, 10 Drawing Sheets

PAIRING METHOD OF DUAL CHANNEL AND MOBILE DEVICE

CROSS-REFERENCE TO RELATED APPLICATION

This application claims the priority benefit of Taiwan application serial no. 112114734, filed on Apr. 20, 2023. The entirety of the above-mentioned patent application is hereby incorporated by reference herein and made a part of this specification.

BACKGROUND

Technical Field

The disclosure relates to an audio processing technology, and in particular relates to a pairing method of dual channel and a mobile device.

Description of Related Art

Smart speakers may be wirelessly connected to electronic devices and play music accordingly. After connecting a mobile device to a smart speaker system, audio signals of dual channel may be output to the smart speaker system respectively, allowing users to experience realistic stereo sound effects.

However, the users are usually not sure about which smart speaker outputs audio signals for the left channel or the right channel.

SUMMARY

An embodiment of the disclosure provides a pairing method of dual channel and a mobile device, which can solve the aforementioned problems.

A pairing method of dual channel according to an embodiment of the disclosure is suitable for two audio playback devices having speakers and microphone arrays and a mobile device. The pairing method includes (but is not limited to) the following. An available area is defined according to a first position relation between the two audio playback devices and a reference target. The first position relation is whether the reference target is positioned between the two audio playback devices, and the available area is an area extending from a position between the two audio playback devices to two sides of the reference target. A second position relation of the mobile device and the available area is determined. The second position relation includes the mobile device being positioned within the available area and the mobile device not being positioned within the available area. The second position relation is determined based on a third position relation between the two audio playback devices and the mobile device. The third position relation is a relative position between any two of the two audio playback devices and the mobile device, and the third position relation is determined based on the power obtained by one of the two audio playback devices and the mobile device receiving a test audio signal played by another one of the two audio playback devices and the mobile device through the beamforming technology. A first corresponding relation between the two audio playback devices and audio signals of a left channel and a right channel is determined according to the second position relation. The first corresponding relation includes one of the two audio playback devices corresponding to the audio signal of the left channel and another one of the two audio playback devices corresponding to the audio signal of the right channel. A second corresponding relation of two sides of the available area with respect to the left channel and the right channel has been defined. The second corresponding relation includes one side of the two sides of the available area corresponding to the audio signal of the left channel and another side of the two sides of the available area corresponding to the audio signal of the right channel. The audio signals of the left channel and the right channel are played by the two audio playback devices respectively according to the first corresponding relation.

A mobile device according to an embodiment of the disclosure includes (but is not limited to) a communication transceiver, a storage, and a processor. The storage is used to store program codes. The processor is coupled to the communication transceiver and the storage. The processor is configured to execute the program codes to: define an available area according to a first position relation between two audio playback devices and a reference target, determine a second position relation of the mobile device and the available area, determine a first corresponding relation between the two audio playback devices and audio signals of a left channel and a right channel according to the second position relation, and play the audio signals of the left channel and the right channel by the two audio playback devices respectively according to the first corresponding relation. The first position relation is whether the reference target is positioned between the two audio playback devices, and the available area is an area extending from a position between the two audio playback devices to two sides of the reference target. The second position relation includes the mobile device being positioned within the available area and the mobile device not being positioned within the available area. The second position relation is determined based on a third position relation between the two audio playback devices and the mobile device. The third position relation is a relative position between any two of the two audio playback devices and the mobile device, and the third position relation is determined based on the power obtained by one of the two audio playback devices and the mobile device receiving a test audio signal played by another one of the two audio playback devices and the mobile device through the beamforming technology. The first corresponding relation includes one of the two audio playback devices corresponding to the audio signal of the left channel and another one of the two audio playback devices corresponding to the audio signal of the right channel. A second corresponding relation of two sides of the available area with respect to the left channel and the right channel has been defined. The second corresponding relation includes one side of the two sides of the available area corresponding to the audio signal of the left channel and another side of the two sides of the available area corresponding to the audio signal of the right channel.

Based on the above, the pairing method of dual channel and the mobile device according to the embodiments of the disclosure determines the relative positions between the two audio playback devices and the mobile device through a sound source localization technology, whether the mobile device is positioned within the available area available for forming an effect of dual channel is determined, and the audio signals of the dual channels and the two audio playback devices are paired accordingly. In this way, the dual channels may be paired automatically.

In order to make the above-mentioned features and advantages of the disclosure more comprehensible, the following embodiments are provided for a detailed description along with accompanying drawings.

DESCRIPTION OF THE EMBODIMENTS

Figure 1:
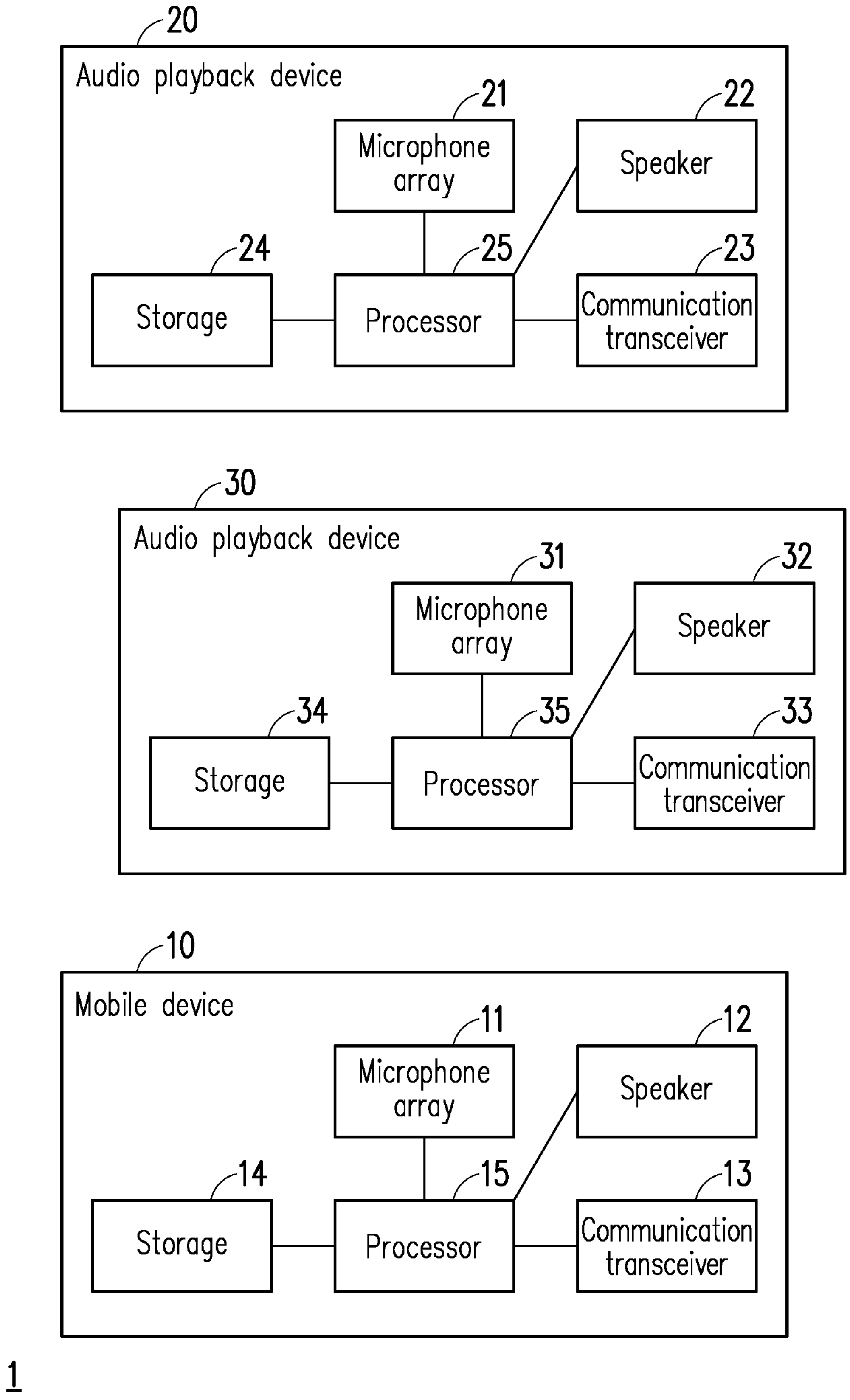
FIG. 1 is a component block diagram of a system according to an embodiment of the disclosure.

FIG. 1 is a component block diagram of a system 1 according to an embodiment of the disclosure Please refer to FIG. 1. The system 1 includes (but is not limited to) a mobile device 10 and two audio playback devices 20, 30.

The mobile device 10 may be a smartphone, a tablet computer, a laptop, an intelligent assistant device, a wearable device, or other electronic devices.

The mobile device 10 includes (but is not limited to) a microphone array 11, a speaker 12, a communication transceiver 13, a storage 14, and a processor 15.

The microphone array 11 includes multiple microphones. The multiple microphones may be dynamic, condenser, electret condenser, or other types of microphones, the microphones may also be other electronic components, analog-to-digital converters, filters, and audio processors or combinations thereof that may receive sound waves (e.g., human voice, ambient noise, machine operation noise) (that is, receive sounds or record sounds) and convert into audio signals. In an embodiment, the microphone array 11 is used to receive or record sounds.

The speaker 12 may be various types of speakers or amplifiers. In an embodiment, the speaker 12 is used to play sounds.

The communication transceiver 13 may support Bluetooth, Wi-Fi, or other wireless communication receiving and transmitting circuits. The communication transceiver 13 may include digital-to-analog converters, analog-to-digital converters, amplifiers, filters, and/or mixers. In an embodiment, the communication transceiver 13 is used to receive signals/data/information from external devices (for example, the audio playback devices 20, 30).

The storage 14 may be any type of fixed or removable random access memory (RAM), read-only memory (ROM), flash memory, hard disk drive (HDD), solid-state drive (SSD), or similar components. In an embodiment, the storage 14 is used to store program codes, software modules, configuration settings, data (such as audio signals, algorithm parameters), or files, and the implementation details will be described later.

The processor 15 is coupled to the microphone array 11, the speaker 12, the communication transceiver 13, and the storage 14. The processor 15 may be a central processing unit (CPU), a graphic processing unit (GPU), or other programmable general-purpose or special-purpose microprocessors, digital signal processors (DSP), programmable controllers, field programmable gate arrays (FPGA), application-specific integrated circuits (ASIC), neural network accelerators, or other similar components or combinations of the aforementioned components. In an embodiment, the processor 15 is used to execute all or part of operations of the mobile device 10 and may load and execute various program codes, software modules, files, and data stored in the storage 14. In some embodiments, functions of the processor 15 may be implemented through software or chips.

The audio playback device 20 may be a wireless speaker, a smart speaker, or an intelligent assistant device.

The audio playback device 20 includes (but is not limited to) a microphone array 21, a speaker 22, a communication transceiver 23, a storage 24, and a processor 25.

Functions and implementation modes of the microphone array 21, the speaker 22, the communication transceiver 23, the storage 24, and the processor 25 may be respectively referred to the descriptions of the microphone array 11, the speaker 12, the communication transceiver 13, the storage 14, and the processor 15, and will not be repeated here.

In an embodiment, the processor 25 is used to execute all or part of operations of the audio playback device 20 and may load and execute various program codes, software modules, files, and data stored in the storage 24. In some embodiments, functions of the processor 25 may be implemented through software or chips.

In an embodiment, the processor 25 may integrate functions such as analog-to-digital converters, digital-to-analog converters, amplifiers, filters, or other audio processing components. In some embodiments, the functions may be implemented through one or more audio processing components respectively.

The audio playback device 30 may be a wireless speaker, a smart speaker, or an intelligent assistant device.

The audio playback device 30 includes (but is not limited to) a microphone array 31, a speaker 32, a communication transceiver 33, a storage 34, and a processor 35.

Functions and implementation modes of the microphone array 31, the speaker 32, the communication transceiver 33, the storage 34, and the processor 35 may be respectively referred to the descriptions of the microphone array 11, the speaker 12, the communication transceiver 13, the storage 14, and the processor 15, and will not be repeated here.

In an embodiment, the processor 35 is used to execute all or part of operations of the audio playback device 30 and may load and execute various program codes, software modules, files, and data stored in the storage 34. In some embodiments, functions of the processor 35 may be implemented through software or chips.

In an embodiment, the processor 35 may integrate functions such as analog-to-digital converters, digital-to-analog converters, amplifiers, filters, or other audio processing components. In some embodiments, the functions may be implemented through one or more audio processing components respectively.

In an embodiment, the mobile device 10 may be loaded with an application program for controlling the audio playback devices 20, 30. Functions of the application program include, for example, EQ settings, activation/deactivation, or volume adjustment.

In an embodiment, the mobile device 10 may transmit audio signals to the audio playback devices 20, 30 via a wireless network. The processors 25, 35 of the audio playback devices 20, 30 may convert digital signals into analog signals, increase the audio signals to an appropriate volume, and finally play the audio signals through the speakers 22, 32.

In an embodiment, received audio signals obtained by the microphone arrays 21, 31 from receiving sounds or recording sounds may be converted from analog signals to digital signals and transmitted to the mobile device 10 via the wireless network.

In the following description, the method of the disclosure will be described in conjunction with components and modules in the mobile device 10 and the audio playback devices 20, 30. Various processes of the method may be adjusted according to implementation situations and are not limited thereto.

Figure 2:
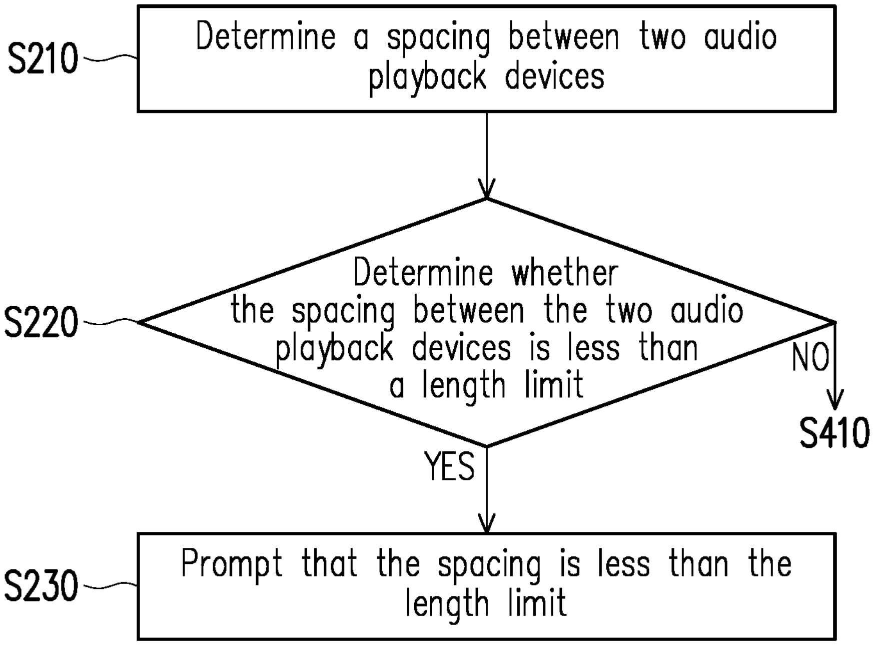
FIG. 2 is a flowchart of a spacing determining method according to an embodiment of the disclosure.

FIG. 2 is a flowchart of a spacing determining method according to an embodiment of the disclosure. Please refer to FIG. 2. The processor 15 determines a spacing between the two audio playback devices 20, 30 (Step S210). Specifically, the two audio playback devices 20, 30 may play test audio signals respectively. The test audio signal may be a fixed frequency or a frequency-varying ultrasonic signal or a high-frequency audio signal. Ultrasonic or high-frequency may refer to frequencies above 20 kilohertz (kHz). Alternatively, the test audio signal may be any type of music, speech, ambient sound, or white noise. On the other hand, during a process of playing the test audio signal by the audio playback devices 20, 30 through the speakers 22, 32 thereof, other audio playback devices 30, 20 record sounds or receive sounds through the microphone arrays 31, 21.

The processor 15 may obtain received audio signals (i.e., the received audio signals obtained by respectively receiving or recording the test audio signals) from the audio playback devices 20, 30 through the communication transceiver 13. The processor 15 may determine the spacing between the two audio playback devices 20, 30 according to the power of the received audio signals. If the signal power is stronger, the spacing between the two audio playback devices 20, 30 is shorter; if the signal power is weaker, the spacing between the two audio playback devices 20, 30 is longer. For example, the signal power is inversely proportional to the square of the spacing, but it may still be affected by factors such as environment or receiver sensitivity. The storage 14 may store multiple corresponding relations or formulas between signal power and the spacing thereof in advance for the spacing decision-making.

Figure 3:
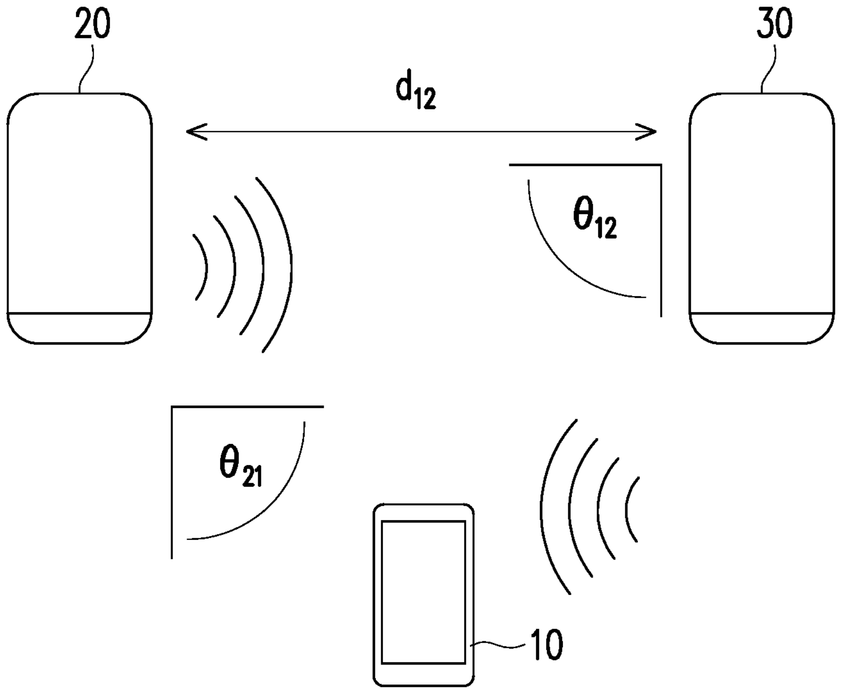
FIG. 3 is a schematic diagram of a position relation between two audio playback devices according to an embodiment of the disclosure.

FIG. 3 is a schematic diagram of a position relation between the two audio playback devices 20, 30 according to an embodiment of the disclosure. Please refer to FIG. 3. The position relation is relative positions of the two audio playback devices 20, 30. The relative positions may be determined by relative distances and angles. Assuming that the characteristics of the test audio signal and the speakers 22, 32 are known, the processor 15 may determine a relative distance d12 (i.e., the spacing between the two audio playback devices 20, 30) based on the received audio signal.

Regarding a relative angle (i.e., an angle $\theta_{12}$ of the audio playback device 20 relative to the audio playback device 30 or an angle $\theta_{21}$ of the audio playback device 30 relative to the audio playback device 20), the microphone arrays 21, 31 may form beams with multiple receiving directions (or pointing angles). The microphone arrays 21, 31 may form beams according to the beamforming technology. Beamforming may be achieved by adjusting the parameters (e.g., phase and amplitude) of the basic units of the phase array so that signals at certain angles obtain constructive interference, while signals at some other angles obtain destructive interference. Therefore, different parameters form different beam patterns, and the receiving direction of the main beam may vary. The processor 15 may generate multiple receiving directions by predefining or based on operations input by users. For example, every 10° interval from −90° to 90° may be used as a receiving direction.

During a process of playing test audio signals, the microphone arrays 21, 31 switch to specific pointing angles, and the processor 15 measures the signal power obtained from receiving the beam at current pointing angles through the microphone arrays 21, 31. The processor 15 may determine a relative angle according to the signal power obtained from receiving the beam at the pointing angles, and the relative angle is related to the pointing angle with a high signal power. For example, the processor 15 may define a power threshold value and determine whether the signal power corresponding to each pointing angle is greater than the power threshold value. If the signal power corresponding to the pointing angle is greater than the signal threshold value, then the processor 15 may determine that there is a sound source (i.e., other audio playback devices 20, 30) on the pointing angle and take the pointing angle as a relative angle relative to the audio playback devices 30, 20. If the signal power corresponding to the pointing angle is not greater than the signal threshold value, then the processor 15 may determine that there is no sound source (i.e., other audio playback devices 20, 30) on the pointing angle. For another example, the processor 15 selects one or a specific number of pointing angles with a high signal power as relative angles. It should be noted that the signal threshold value may be determined in advance according to experiments or preset information and may vary according to actual needs.

In some embodiments, the processor 15 may improve the accuracy of relative angle prediction through the AI-beamforming technology. For example, a machine learning model may be trained according to characteristics and reception strength of the microphone arrays 31, 21, as well as the actual position of the sound source, so that the machine learning model may infer a corresponding sound source position for the data to be evaluated (for example, the reception strength of the microphone arrays 31, 21). In this way, interference can be effectively avoided.

In another embodiment, the processor 15 may estimate the relative angle of the audio playback devices 20, 30 relative to other audio playback devices 30, 20 based on the angle of arrival (AOA, or degree of arrival, DOA) positioning technology. For example, the processor 15 may determine the relative angle based on the time difference between the two sound waves arriving at microphone arrays 31, 21 of other audio playback devices 30, 20 after the test audio signal is reflected through the audio playback devices 20, 30 and a distance between two adjacent microphones in the microphone arrays 31, 21.

The processor 15 determines whether the spacing between the two audio playback devices 20, 30 is less than a length limit (Step S220). Specifically, the length limit is one of the limits of the available area for forming an effect of dual channel. The length limit may be, for example, 50 centimeters, 1 meter, or 2 meters, and may change according to specifications or capabilities of the speakers 22, 32 of the two audio playback devices 20, 30. The available area will be described in detail in subsequent embodiments.

In response to the spacing between the two audio playback devices 20, 30 being less than the length limit, the processor 15 prompts that the spacing is less than the length limit or prompts that the spacing should be greater than the length limit (Step S230). For example, voice commands, music, or warning tones are played through the speakers 12, 22, 32. Alternatively, the prompt content is displayed on a display (not shown in the drawing). In response to the spacing between the two audio playback devices 20, 30 is not less than the length limit, the processor 15 executes subsequent steps of dual channel pairing (for example, entering Step S410). That is to say, through prompting, the user is guided to separate the two audio playback devices 20, 30 until the spacing thereof is greater than the length limit.

Figure 4:
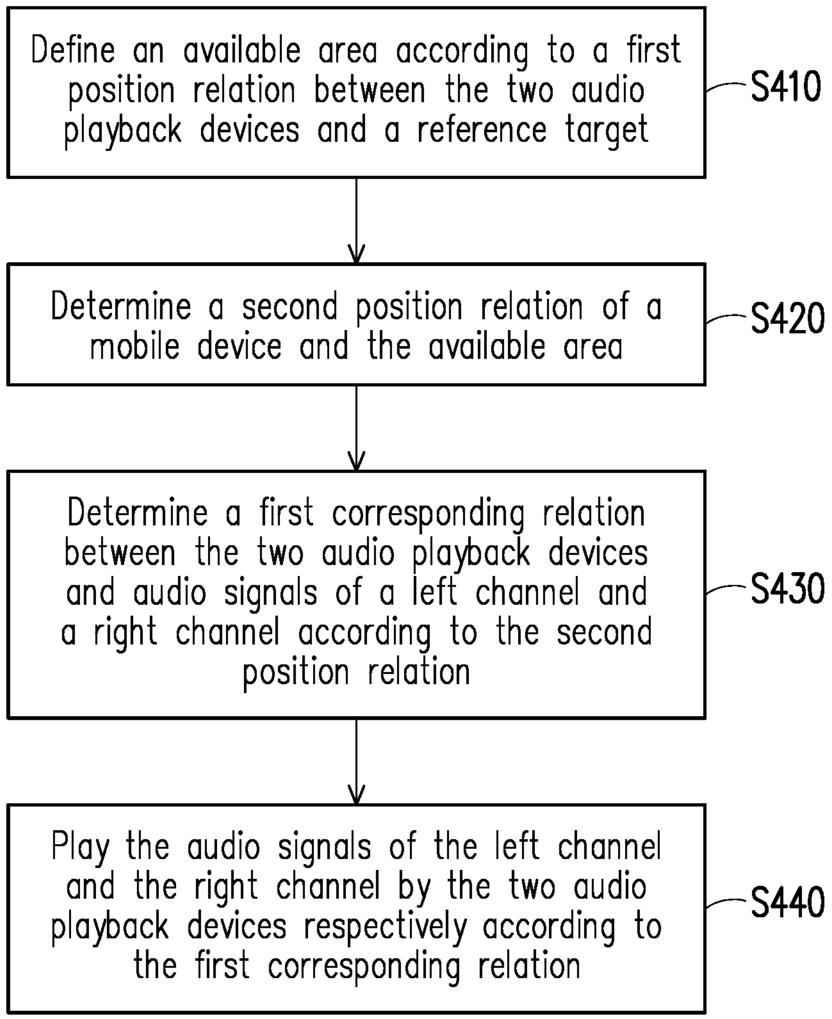
FIG. 4 is a flowchart of a pairing method of dual channel according to an embodiment of the disclosure.

FIG. 4 is a flowchart of a pairing method of dual channel according to an embodiment of the disclosure. Please refer to FIG. 4. The processor 15 defines an available area according to a first position relation between the two audio playback devices 20, 30, and the reference target (Step S410). Specifically, the first position relation is whether the reference target is positioned between the two audio playback devices 20, 30. The reference target may be an imaginary user. Generally speaking, when the head of the user is positioned at a specific position relative to the two audio playback devices 20, 30 and listens to the audio signals of the left channel and the right channel, an experience of dual channel may be felt. In an embodiment, the processor 15 may use the position of the mobile device 10 as the position of the head of the user.

Figure 5:
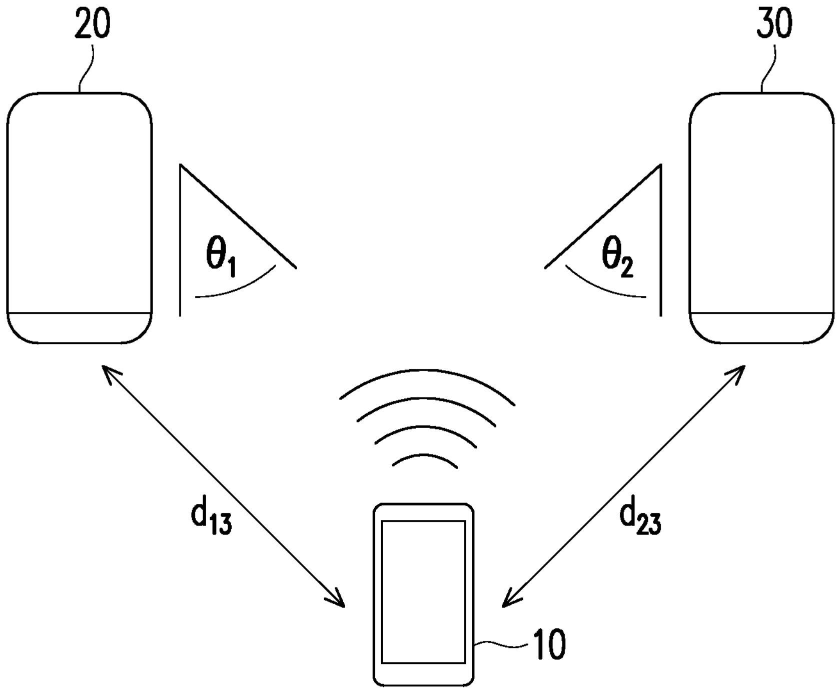
FIG. 5 is a schematic diagram of a position relation between two audio playback devices and a mobile device according to an embodiment of the disclosure.

FIG. 5 is a schematic diagram of a position relation between the two audio playback devices 20, 30 and the mobile device 10 according to an embodiment of the disclosure. Please refer to FIG. 5. The position relation is relative positions between any two of the two audio playback devices 20, 30 and the mobile device 10. As previously described, the relative positions may be determined by a relative distances and an angles. The processor 15 may determine relative distances $d_{13}$, $d_{23}$ (i.e., spacings between the two audio playback devices 20, 30 and the mobile device 10 respectively) and relative angles $\theta_1$, $\theta_2$ (i.e., angles of the two audio playback devices 20, 30 relative to the mobile device 10 respectively) based on the power obtained by one of the two audio playback devices 20, 30 and the mobile device 10 receiving a test audio signal played by another one of the two audio playback devices 20, 30 and the mobile device 10 through the beamforming technology. The determination of the relative position may be based on the aforementioned description (e.g., the description of Step S210 in FIG. 2 and FIG. 3), which will not be repeated here.

On the other hand, the available area is an area extending from a position between the two audio playback devices 20, 30 to two sides of the reference target. The position may be the midpoint between the two audio playback devices 20, 30 or any point on the connection line of the two audio playback devices 20, 30. The available area may be considered as the area within which users may perceive an experience of dual channel through their hearing.

Figure 6A:
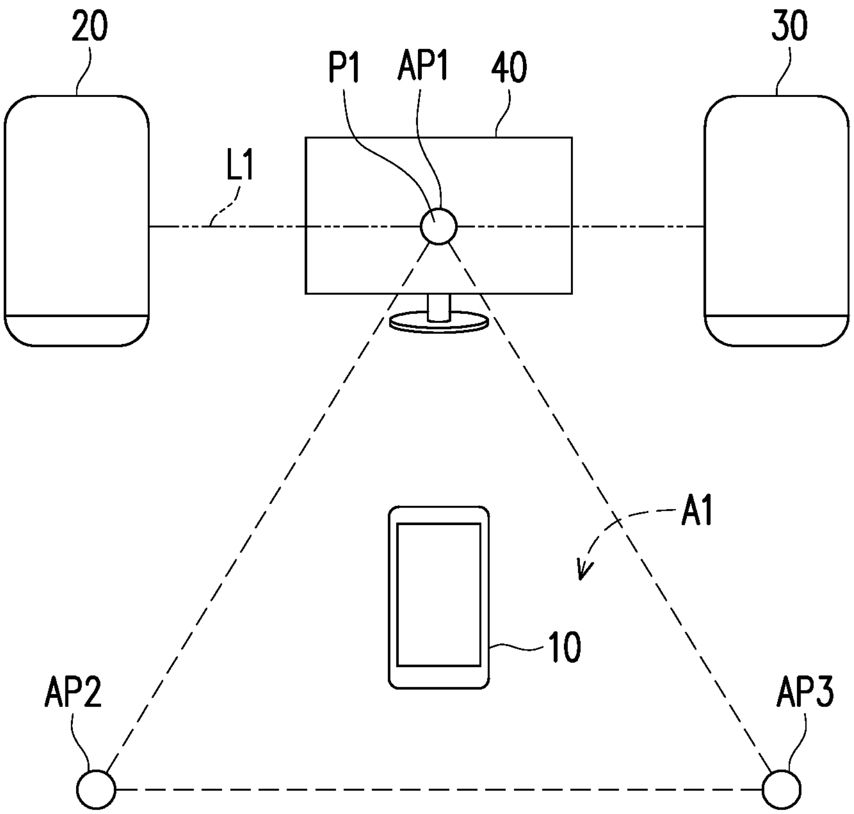
FIG. 6A is a schematic diagram of an available area according to an embodiment of the disclosure.

FIG. 6A is a schematic diagram of an available area A1 according to an embodiment of the disclosure. Referring to FIG. 6A, in response to the first position relation being the reference target positioned outside a connection line L1 between the two audio playback devices 20, 30, the processor 15 may define the available area as the triangular available area A1. A vertex AP1 of the triangle is positioned at a position P1 (for example, a midpoint) between the two audio playback devices 20, 30, and other two vertices AP2 and AP3 are positioned at two sides (for example, extending straight left and right from the two sides of the mobile device 10 may reach the two vertices AP2 and AP3) of the reference target (taking the mobile device 10 as an example). In an application scenario, a display 40 is positioned on the connection line L1. That is, the two audio playback devices 20, 30 are positioned at two sides of the display 40. The head of the user is usually far away from the connection line L1. At this time, extending from the position P1 to the two sides of the head of the user may form the available area A1.

Figure 6B:
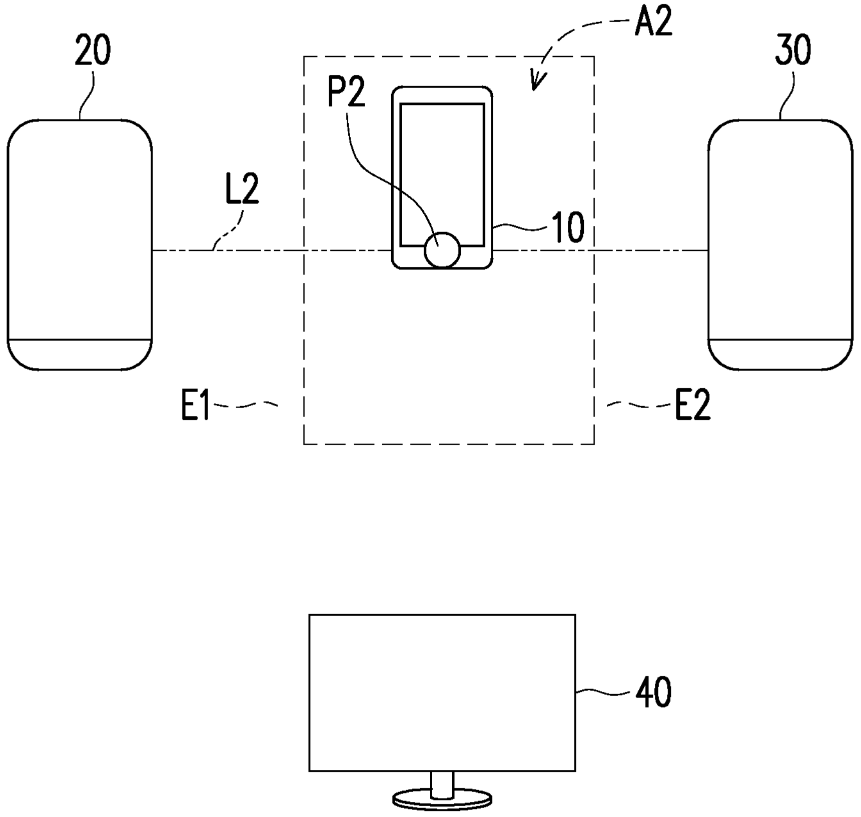
FIG. 6B is a schematic diagram of an available area according to another embodiment of the disclosure.

FIG. 6B is a schematic diagram of an available area A2 according to another embodiment of the disclosure. Referring to FIG. 6B, in response to the first position relation being the reference target positioned on a connection line L2 between the two audio playback devices 20, 30, and the processor 15 may define the available area as the rectangular available area A2. A center point of the rectangle is positioned at a position P2 between the two audio playback devices 20, 30, and two opposite sides E1, E2 of the rectangle are positioned at two sides of the reference target (taking the mobile device 10 as an example). In an application scenario, the head of the user is positioned on the connection line L2. That is, the two audio playback devices 20, 30 are positioned at two sides of the head of the user. The display 40 may be far away from the connection line L2. At this time, extending from the position P2 to the two sides of the head of the user may form the available area A2, that is, an area positioned right between the two audio playback devices 20, 30.

In other embodiments, the shape, size, and/or position of the available area may also change.

Please refer to FIG. 4. The processor 15 determines a second position relation of the mobile device 10 and the available area (Step S420). Specifically, the second position relation may be the mobile device 10 being positioned within the available area and the mobile device 10 not being positioned within the available area. The second position relation is determined based on a third position relation between the two audio playback devices 20, 30, and the mobile device 10, and the third position relation is a relative position between any two of the two audio playback devices 20, 30 and the mobile device 10. The processor 15 may determine the third position relation based on the power obtained by one of the two audio playback devices 20, 30 and the mobile device 10 receiving a test audio signal played by another one of the two audio playback devices 20, 30 and the mobile device 10 through the beamforming technology. Regarding the determination of the third position relation, please refer to the descriptions of Step S210, FIG. 3, and FIG. 5 (for example, the relative distances $d_{12}$, $d_{13}$, $d_{23}$, the angles $\theta_{12}$, $\theta_{21}$, and/or the relative angles $\theta_1$, $\theta_2$), which will not be repeated here.

Since the available area is defined based on the relative positions of the two audio playback devices 20, 30, whether the mobile device 10 is within the available area may be determined according to the third position relation between the two audio playback devices 20, 30 and the mobile device 10.

Figure 7:
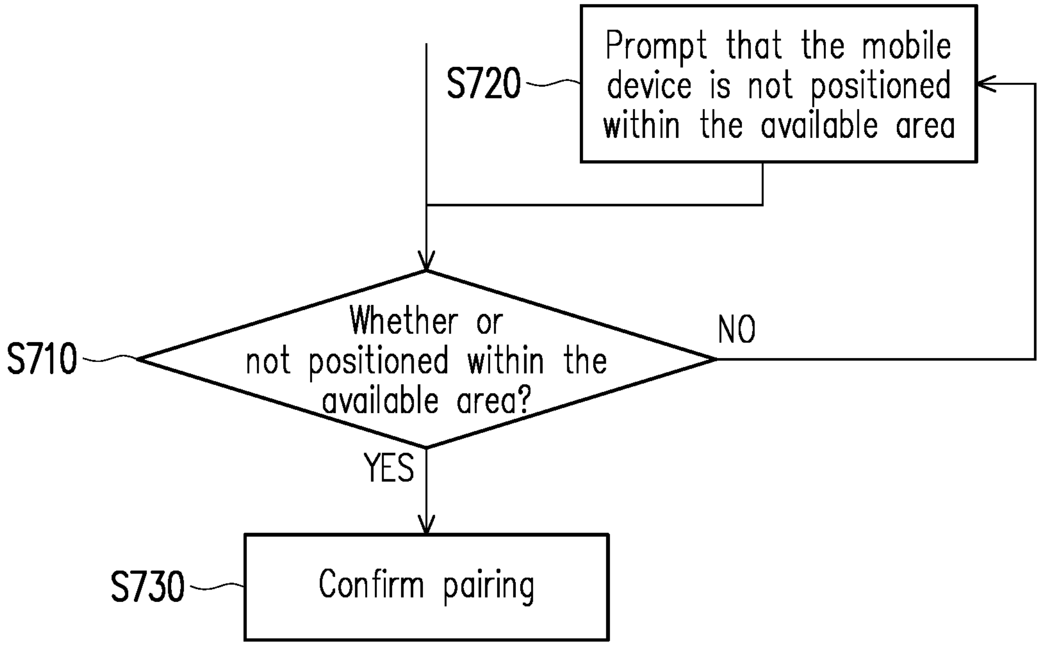
FIG. 7 is a flowchart of pairing confirmation and prompting according to an embodiment of the disclosure.
Figure 8A:
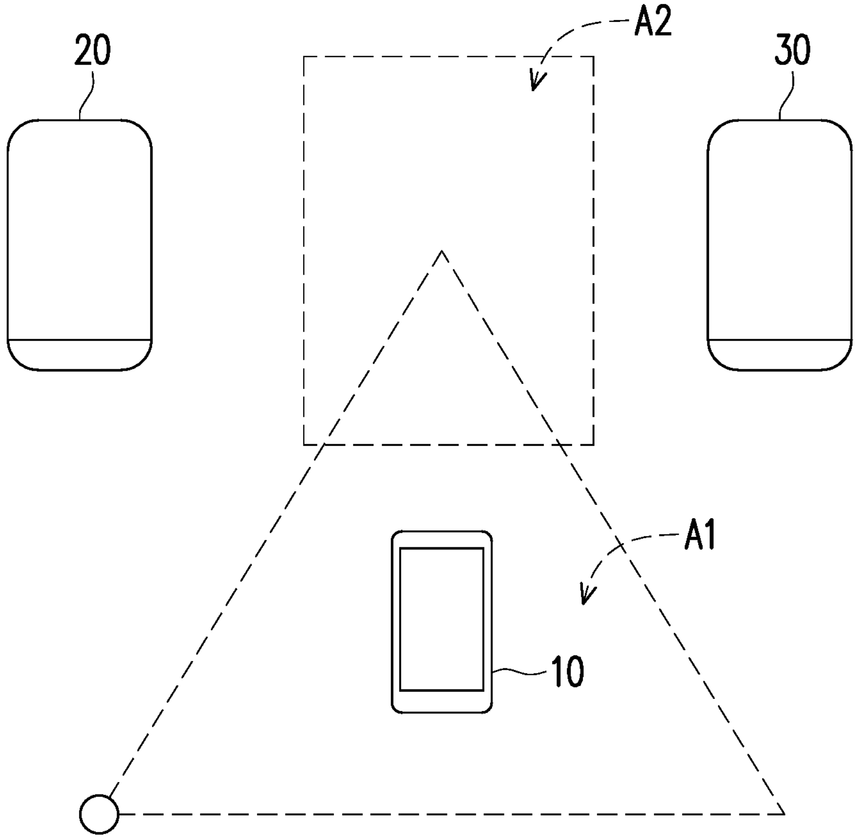
FIG. 8A is a schematic diagram illustrating being positioned within the available area according to an embodiment of the disclosure.

FIG. 7 is a flowchart of pairing confirmation and prompting according to an embodiment of the disclosure. Please refer to FIG. 7. The processor 15 may determine whether the mobile device 10 is positioned within the available area (Step S710). For example, FIG. 8A is a schematic diagram illustrating being positioned within the available areas A1 and A2 according to an embodiment of the disclosure. Please refer to FIG. 8A. The processor 15 may integrate the available areas A1 and A2 or select one of the available areas A1 and A2 as the available area used for determination. As shown in FIG. 8A, the mobile device 10 is positioned within the available area A1.

Figure 8B:
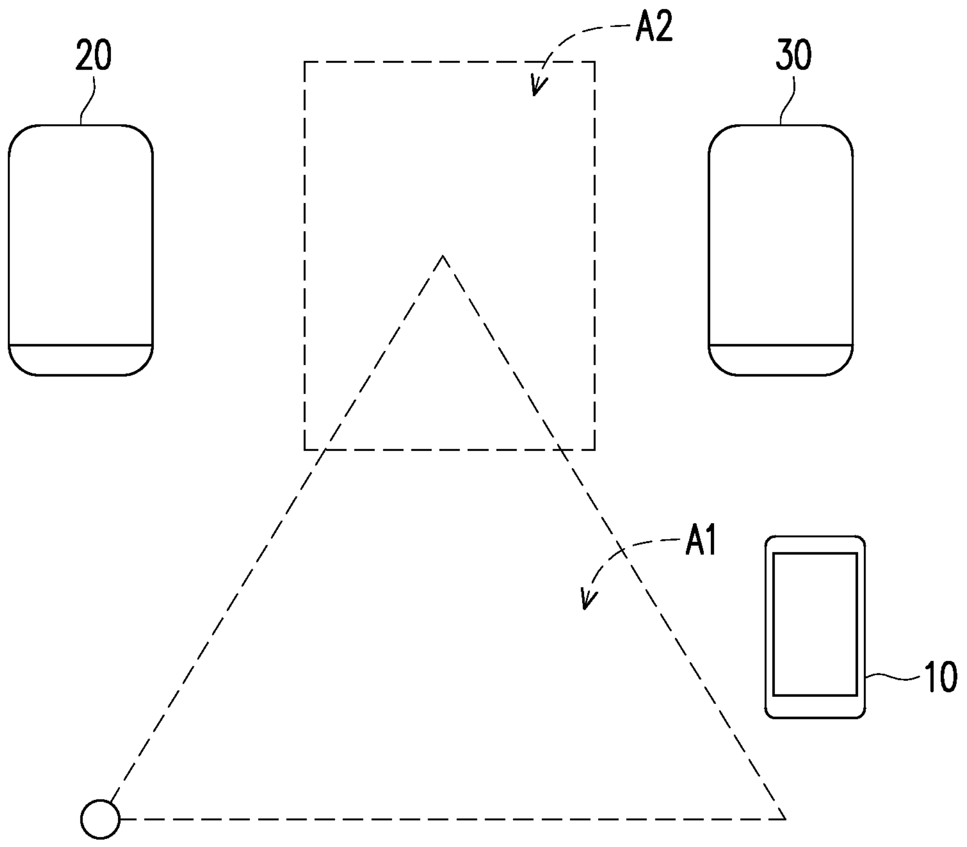
FIG. 8B is a schematic diagram illustrating not being positioned within the available area according to an embodiment of the disclosure.

For another example, FIG. 8B is a schematic diagram illustrating not being positioned within the available areas A1 and A2 according to an embodiment of the disclosure. Please refer to FIG. 8B. The mobile device 10 is not positioned within the available areas A1 and A2.

Please refer to FIG. 7, in response to the mobile device 10 not being positioned within the available area, the processor 15 may prompt that the mobile device 10 is not positioned within the available area (Step S720). Voice commands, music, or warning tones may be played through the speakers 12, 22, 32. For another example, the prompt content may be displayed on a display (not shown in the drawing). The voice command or the prompt content may further guide users on how to position the mobile device 10 within the available area, for example, a voice command to move the mobile device 10 to the right. Next, continue to confirm the second position relation. On the other hand, in response to the mobile device 10 being positioned within the available area, the processor 15 may confirm pairing (Step S730). That is to say, by prompting, users are guided to move the mobile device 10 into the available area.

Please refer to FIG. 4. The processor 15 determines a first corresponding relation of the two audio playback devices 20, 30 and the audio signals of the left channel and the right channel according to the second position relation (Step S430). Specifically, the first corresponding relation includes one of the two audio playback devices 20, 30 corresponding to the audio signal of the left channel and another one of the two audio playback devices 20, 30 corresponding to the audio signal of the right channel. The processor 15 has defined a second corresponding relation of two sides of the available area with respect to the left channel and the right channel. The second corresponding relation includes one side of the two sides of the available area corresponding to the audio signal of the left channel and another side of the two sides of the available area corresponding to the audio signal of the right channel.

Taking FIG. 6A as an example, the available area A1 on the right side of the drawing corresponds to the audio signal of the right channel, and the available area A1 on the left side of the drawing corresponds to the audio signal of the left channel. It is assumed that the application scenario is the user facing the middle (such as where the display 40 is located) of the audio playback devices 20, 30. Therefore, in response to the second position relation being the mobile device 10 positioned within the available area, the processor 15 may determine the first corresponding relation to be that the audio playback device 20 near the vertex AP2 corresponds to the audio signal of the left channel, and that the audio playback device 30 near the vertex AP3 corresponds to the audio signal of the right channel.

Taking FIG. 6B as an example, the side E1 of the available area A2 corresponds to the audio signal of the right channel, and the side E2 of the available area A2 corresponds to the audio signal of the left channel. It is assumed that the application scenario is the head of the user facing downward of the drawing. Therefore, in response to the second position relation being the mobile device 10 positioned within the available area, the processor 15 may determine the first corresponding relation to be that the audio playback device 20 near the side E1 corresponds to the audio signal of the right channel, and that the audio playback device 30 near the side E2 corresponds to the audio signal of the left channel.

It is assumed that another application scenario is the head of the user facing upward of the drawing. Therefore, in response to the second position relation being the mobile device 10 positioned within the available area, the processor 15 may determine the first corresponding relation to be that the audio playback device 20 near the side E1 corresponds to the audio signal of the left channel, and that the audio playback device 30 near the side E2 corresponds to the audio signal of the right channel.

Please refer to FIG. 4. The processor 15 plays the audio signals of the left channel and the right channel by the two audio playback devices 20, 30 respectively according to the first corresponding relation (Step S440). Specifically, the processor 15 transmits audio signals of the left channel and the right channel to the two audio playback devices 20, 30 through the communication transceiver 13 according to the first corresponding relation. For example, if the first corresponding relation is that the audio playback devices 20, 30 correspond to the left channel and the right channel respectively, then the audio signal of the left channel is transmitted to the audio playback device 20, and the audio signal of the right channel is transmitted to the audio playback device 30. For another example, if the first corresponding relation is that the audio playback devices 20, 30 correspond to the right channel and the left channel respectively, then the audio signal of the right channel is transmitted to the audio playback device 20, and the audio signal of the left channel is transmitted to the audio playback device 30. In other words, after confirming that the mobile device 10 is positioned within the available area, audio signals may be corresponded to channels through the audio playback devices 20, 30, and the pairing of dual channels is completed accordingly. When the head of the user is located at the position (within the available area) of the mobile device 10, the left channel and the right channel may be recognized.

In summary, in the pairing method of dual channel and mobile device of the disclosure, the position of the sound source (for example, the relative positions of the two audio playback devices and the mobile device) is determined based on beamforming, whether the mobile device is positioned within the available area is determined, and the audio signals of the dual channels are paired accordingly. In this way, the convenience of pairing can be improved, and the existing problem that the channels could not be distinguished can be solved.

Although the disclosure has been disclosed in the above embodiments, the embodiments are not intended to limit the disclosure. Persons with general knowledge in the relevant technical field may make modifications and refinements without departing from the spirit and scope of the disclosure. Therefore, the scope of protection of the disclosure shall be defined by the appended claims.

What is claimed is:

1. A pairing method of dual channel suitable for two audio playback devices having speakers and microphone arrays and a mobile device, the pairing method comprising:

defining an available area according to a first position relation between the two audio playback devices and a reference target, wherein the first position relation is whether the reference target is positioned between the two audio playback devices, and the available area is an area extending from a position between the two audio playback devices to two sides of the reference target;

determining a second position relation of the mobile device and the available area, wherein the second position relation comprises the mobile device being positioned within the available area and the mobile device not being positioned within the available area, the second position relation is determined based on a third position relation between the two audio playback devices and the mobile device, the third position relation is a relative position between any two of the two audio playback devices and the mobile device, the third position relation is determined based on power obtained by one of the two audio playback devices and the mobile device receiving a test audio signal played by another one of the two audio playback devices and the mobile device through a beamforming technology, and determining the second position relation of the mobile device and the available area comprises:

forming, by the microphone arrays, beams according to the beamforming technology; and determining a relative angle corresponding to the mobile device and one of the two audio playback devices according to a signal power obtained from receiving one of the beams at a pointing angle, wherein the relative angle is related to the pointing angle with the signal power larger than a power threshold value;

determining a first corresponding relation between the two audio playback devices and audio signals of a left channel and a right channel according to the second position relation, wherein the first corresponding relation comprises one of the two audio playback devices corresponding to the audio signal of the left channel and another one of the two audio playback devices corresponding to the audio signal of the right channel, a second corresponding relation of two sides of the available area with respect to the left channel and the right channel has been defined, and the second corresponding relation comprises one side of the two sides of the available area corresponding to the audio signal of the left channel and another side of the two sides of the available area corresponding to the audio signal of the right channel; and playing the audio signals of the left channel and the right channel by the two audio playback devices respectively according to the first corresponding relation.

2. The pairing method of dual channel according to claim 1, wherein defining the available area according to the first position relation between the two audio playback devices and the reference target comprises:

in response to the first position relation being the reference target positioned outside a connection line between the two audio playback devices, defining the available area as a triangle, wherein a vertex of the triangle is positioned at a position between the two audio playback devices, and the other two vertices are positioned at two sides of the reference target.

3. The pairing method of dual channel according to claim 1, wherein defining the available area according to the first position relation between the two audio playback devices and the reference target comprises:

in response to the first position relation being the reference target positioned on a connection line between the two audio playback devices, defining the available area as a rectangle, wherein a center point of the rectangle is positioned at a position between the two audio playback devices, and two opposite sides of the rectangle are positioned at two sides of the reference target.

4. The pairing method of dual channel according to claim 1, further comprising:

determining whether a spacing between the two audio playback devices is less than a length limit of the available area; and prompting that the spacing between the two audio playback devices is less than the length limit.

5. The pairing method of dual channel according to claim 1, wherein the test audio signal is an ultrasonic signal.

6. The pairing method of dual channel according to claim 1, further comprising:

training a machine learning model according to characteristics and reception strength of the microphone arrays and an actual position of a sound source, wherein the machine learning model is used to predict the relative angle.

7. The pairing method of dual channel according to claim 1, further comprising:

determining whether the mobile device is positioned within the available area;

in response to the mobile device not being positioned within the available area, prompting that the mobile device is not positioned within the available area; and in response to the mobile device being positioned within the available area, confirming pairing of the left channel and the right channel.

8. A mobile device, comprising:

a communication transceiver;

a storage used to store program codes;

a processor coupled to the communication transceiver and the storage and configured to execute the program codes to:

define an available area according to a first position relation between two audio playback devices and a reference target, wherein the first position relation is whether the reference target is positioned between the two audio playback devices, and the available area is an area extending from a position between the two audio playback devices to two sides of the reference target;

determine a second position relation of the mobile device and the available area, wherein the second position relation comprises the mobile device being positioned within the available area and the mobile device not being positioned within the available area, the second position relation is determined based on a third position relation between the two audio playback devices and the mobile device, the third position relation is a relative position between any two of the two audio playback devices and the mobile device, and the third position relation is determined based on power obtained by one of the two audio playback devices and the mobile device receiving a test audio signal played by another one of the two audio playback devices and the mobile device through a beamforming technology;

determine a first corresponding relation between the two audio playback devices and audio signals of a left channel and a right channel according to the second position relation, wherein the first corresponding relation comprises one of the two audio playback devices corresponding to the audio signal of the left channel and another one of the two audio playback devices corresponding to the audio signal of the right channel, a second corresponding relation of two sides of the available area with respect to the left channel and the right channel has been defined, and the second corresponding relation comprises one side of the two sides of the available area corresponding to the audio signal of the left channel and another side of the two sides of the available area corresponding to the audio signal of the right channel; and transmitting the audio signals of the left channel and the right channel to the two audio playback devices through the communication transceiver according to the first corresponding relation; and microphone arrays, coupled to the processor, wherein the processor is further used to:

form, by the microphone arrays, beams according to the beamforming technology; and determine a relative angle corresponding to the mobile device and one of the two audio playback devices according to a signal power obtained from receiving one of the beams at a pointing angle, wherein the relative angle is related to the pointing angle with the signal power larger than a power threshold value.

9. The mobile device according to claim 8, wherein the processor is further used to:

in response to the first position relation being the reference target positioned outside a connection line between the two audio playback devices, define the available area as a triangle, wherein a vertex of the triangle is positioned at a position between the two audio playback devices, and the other two vertices are positioned at two sides of the reference target.

10. The mobile device according to claim 8, wherein the processor is further used to:

in response to the first position relation being the reference target positioned on a connection line between the two audio playback devices, define the available area as a rectangle, wherein a center point of the rectangle is positioned at a position between the two audio playback devices, and two opposite sides of the rectangle are positioned at two sides of the reference target.

11. The mobile device according to claim 8, wherein the processor is further used to:

determine whether the spacing between the two audio playback devices is less than a length limit of the available area; and prompt that the spacing between the two audio playback devices is less than the length limit.

12. The mobile device according to claim 8, wherein the test audio signal is an ultrasonic signal.

13. The mobile device according to claim 8, wherein the processor is further used to:

train a machine learning model according to characteristics and reception strength of the microphone arrays and an actual position of a sound source, wherein the machine learning model is used to predict the relative angle.

* * * * *